Jan. 21, 1930.                    C. Q. IVES                    1,744,120
              MEANS FOR TESTING THE DRYNESS OF FIBROUS MATERIAL
                          Filed Dec. 12, 1924
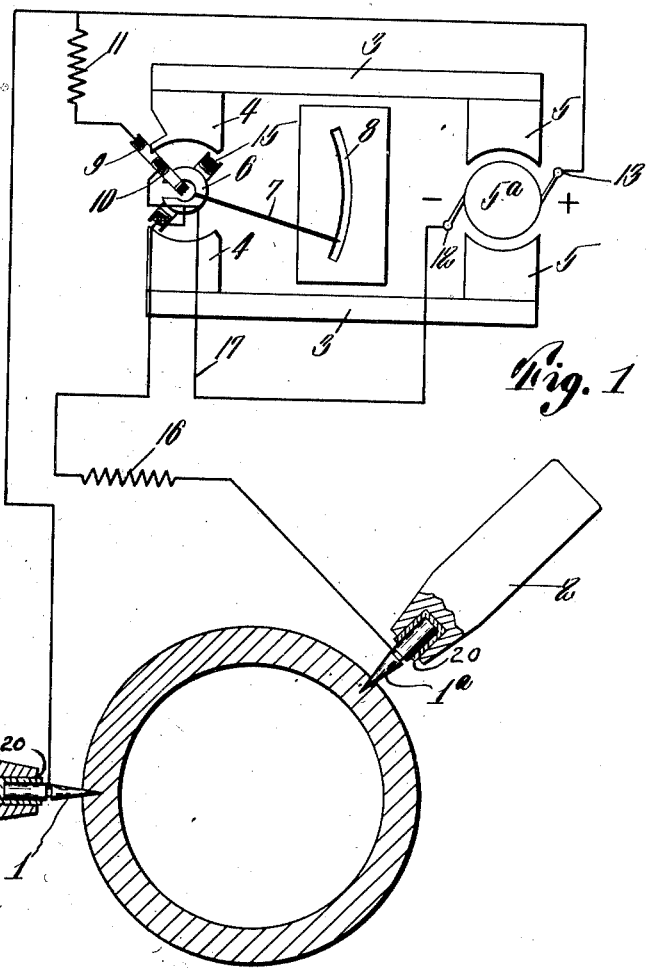
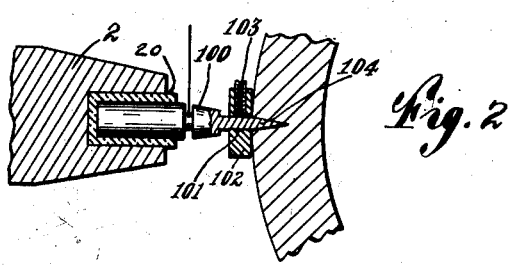
Inventor
Charles Q. Ives
Attys.

Patented Jan. 21, 1930

1,744,120

UNITED STATES PATENT OFFICE

CHARLES Q. IVES, OF BERLIN, NEW HAMPSHIRE, ASSIGNOR TO BROWN COMPANY, OF BERLIN, NEW HAMPSHIRE, A CORPORATION OF MAINE

MEANS FOR TESTING THE DRYNESS OF FIBROUS MATERIAL

Application filed December 12, 1924. Serial No. 755,587.

In the manufacture of articles of material such as wood pulp or other cellulosic stock, they are usually formed up from wet material which is thereafter permitted to dry out. In the manufacture of many articles further treatment is required and for such treatment it is often important that the drying shall have progressed to a certain point before such treatment shall be undertaken. As the exposed surface portions are the first to dry, their condition may not represent the dryness of the material as a whole.

The object of this invention, therefore, is to provide a method and mechanism by which the amount of moisture remaining in the material at a distance from its exposed surfaces may be readily ascertained.

This is done in the present invention by measuring the electrical resistance through the mass of material between a pair of elements inserted beneath the exposed surface thereof to the desired extent and at a suitable distance apart, the higher the electrical resistance of the material between these elements, the more nearly free from moisture the material being. The exact measure of the resistance is usually unimportant, a comparison of the resistance shown in the test of any particular article with that of a similar article known to be sufficiently dry for the purpose desired being usually sufficient.

For a more complete understanding of this invention reference may be had to the accompanying drawing in which Figure 1 shows somewhat diagrammatically a device for determining the relative dryness of a series of similar articles.

Figure 2 is a detail showing a slight modification.

For the purpose of illustration this invention has been shown in connection with a fiber tube, such tube being ordinarily formed by winding up cellulosic sheet material while still wet as formed on a paper machine. After such tubes are sufficiently dried they are usually saturated with some material suitable for the purposes to which they are to be put, usually in the nature of pitch or other waterproofing and electrical insulating material. In order, however, that the saturation may be properly effected it is essential that the moisture be driven off to a certain degree, and, as the outer faces of the tubes are exposed to the atmosphere they dry off much quicker than the interior portions thereof which may still be quite moist when the surface indications would point to the tubes being quite thoroughly dry.

In order to determine the moisture at some distance below these surfaces, this invention provides electrical contact elements which may be inserted into the body of the material, this as shown in the drawing comprising metal points 1 and 1ª. These points are shown as carried by handles 2 having bushings 20 of insulating material and should be inserted beneath the surface of the article to be tested spaced a suitable distance apart. These points should then be connected to a suitable source of electrical current in order to measure the resistance between them through the body of the material, the higher the resistance shown the drier the article being. Of course the actual measure of the resistance is not of great importance in itself, since other factors beside the amount of moisture would have some effect thereon, but where the conditions of the material are otherwise the same the relative resistance becomes a comparative measure of the amount of moisture.

Any desired means may be used to measure the electrical resistance between the points 1 and 1ª through the body of the material, but as shown such mechanism may comprise an indicator having a pair of permanent bar magnets 3 with curved pole pieces 4 and 5 at opposite ends thereof. Between the pole pieces 5 is shown the armature 5ª of a generator which may, if desired, be turned by hand. Between the pole pieces 4 is an oscillatory member 6 to which is attached a pointer 7 intended to traverse a scale 8. This member 6 carries a pair of coils 9 and 10 arranged in series which together with a resistance 11 is in a shunt circuit about the generator brushes 12 and 13. There is also a coil 15 arranged at right angles to the plane of the coils 9 and 10, this coil being in series with a resistance 16 and a wire leading to the points 1ª and the wire 17 leading to the brush 12 of the generator. The other point 1 is connected to the generator brush 12. There are thus formed two paths for the current generated by the generator, one being always closed through the resistance 11 and the coils 9 and 10, and the other shunted about these coils and resistance and including the coil 15, the resistance 16 and the article positioned between the points 1 and 1ª. When the points 1 and 1ª are not in electrical connection so that the shunt circuit including the coil 15 is open, the passage of current through the coils 9 and 10 causes these coils to take a position at right angles to the axis of the pole pieces 4 and midway of the gap therebetween, whereupon the pointer 7 is swung to the upper end of the scale to the point indicating an infinite resistance between the points 1 and 1ª. If the points 1 and 1ª are inserted in the object to be tested, there is immediately established a circuit through the coil 15 depending in amount on the generator voltage and the resistance between the points 1 and 1ª. This current in the coil 15 tends to turn this coil toward a position at right angles to the axis of the pole pieces 4 which action is opposed by the action of the current in the coils 9 and 10. The amount to which the pointer 7 turns away from the infinite resistance position is therefore determined by the amount of current flowing through the coil 15 relative to the amount flowing through the coils 9 and 10 which is dependent on the resistance of the object between the points 1 and 1ª, the greater this resistance, the less being the movement of the needle from the infinite resistance position. As the two circuits, one through the points 1 and 1ª and the other through the coils 9 and 10 derive their potential from the same source being arranged in parallel and shunted about the brushes 12 and 13, it is immaterial what voltage is produced by the generator, and it is therefore immaterial how fast the armature 5ª is rotated. The resistance 16 is employed to prevent an excessive current flow in case the resistance across the points 1 and 1ª is very low, as for example if they should be brought into contact with each other.

If now the distance between the points 1 and 1ª and the cross section of the material is the same in two similar objects, the dryness of one of which is satisfactory, a test of this one object will show a certain indication by the pointer and if more moisture is present in the other object, the indicator arm 7 will swing further away from the infinite resistance position when this object is tested. Thus with any particular set of articles if the desired reading in terms of resistance for the required degree of dryness is known, this known dryness being in percentage, the scale over which the pointer moves may be calibrated directly in percentage of dryness, but however it is calibrated, its movements are in proportion to the amounts of moisture in the articles, other conditions of course being equal.

Particularly where the points are intended to be driven into the material tested, it is desirable to limit the extent to which they shall penetrate in order to provide uniformity of contact area between the points and material to be tested. Such a construction is illustrated in Figure 2 in which the point 101 has a stop collar 102 adjustable longitudinally of the point back from the tip 104 thereof, means such as a set screw 103 being employed to retain the collar in adjusted position.

This mechanism therefore furnishes a comparative reading by which the degrees of dryness of the articles may be ascertained in a very expeditious and economical manner, and if the proper degree of dryness has been shown the articles are known to be ready for their subsequent treatment.

Having thus described an embodiment of this invention, it should be evident that various modifications and changes might be made therein without departing from its spirit or scope as defined by the appended claims.

I claim:

1. A device of the class described comprising a pair of electro-conducting elements, an insulating handle for each of said elements by which they may be inserted at points spaced a suitable distance apart beneath the surface of a fibrous body, means for limiting the extent of penetration into said body to a predetermined depth, and means responsive to the electrical resistance of said body between said elements for measuring the dryness of said body.

2. Apparatus for measuring the dryness of a fibrous body, which comprises a pair of pointed metallic contacts to penetrate below the surface of said body, means for limiting the penetration of said contacts to a predetermined depth, an insulating handle for each contact, a magneto electrically connected to said contacts and operable to set up a voltage difference between the two contacts, and means associated with said magneto and contacts for indicating the electrical resistance between the contacts, said indicating means being unaffected by small voltage variations in the magneto.

In testimony whereof I have affixed my signature.

CHARLES Q. IVES.